United States Patent Office 2,966,232
Patented Dec. 27, 1960

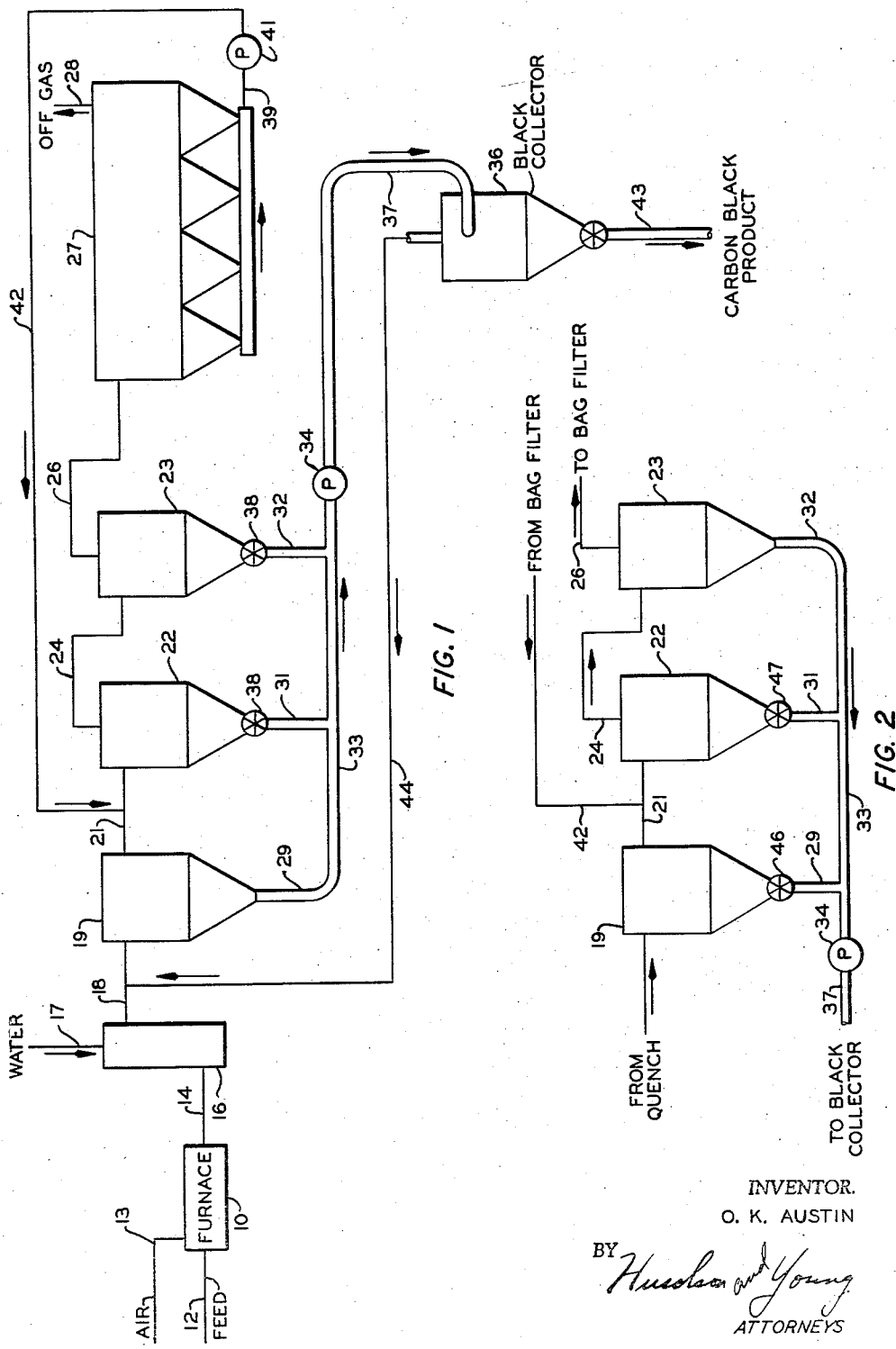

2,966,232

PROCESS AND APPARATUS FOR SEPARATING FINELY DIVIDED SOLIDS FROM FLUIDS

Oliver K. Austin, Bartlesville, Okla., assignor to Phillips Petroleum Company, a corporation of Delaware Filed May 2, 1958, Ser. No. 732,729

8 Claims. (Cl. 183—34)

This invention relates to process and apparatus for separating finely divided solids from fluids.

More particularly, this invention relates to the process of an apparatus for separating finely divided solid material from a fluid such as a gas or liquid. For convenience, the invention is described as it applies to the recovery of carbon black from flue gas.

In the production of furnace carbon black, a hydrocarbon is burned with a limited amount of air to produce an effluent containing gas, water vapor, and suspended finely divided carbon black. It is extremely difficult to separate the black from the gases and conventional operation is to use a plurality of separation means. Such separation means include, for example, an electrical precipitator, one or more cyclone separators, and a bag filter including cloth or woven glass fabric bags. The separation is made as complete as possible so as to recover practically all of the carbon black, this being done for economic reasons and to prevent the release of large quantities of carbon black to the atmosphere.

The present invention is especially suited to a carbon black recovery process and it is related to carbon black producing systems such as that disclosed in Wood 2,776,725 (1957).

The following are objects of my invention.

An object of my invention is to provide improved apparatus for recovery of carbon black from a furnace producing carbon black. A further object of my invention is to provide an improved process for this carbon black recovery. A further object of my invention is to provide improved black conveying means. A further object of my invention is to provide the carbon black recovery system which is simpler and less expensive than systems presently in use.

Other objects and advantages of my invention will be apparent to one skilled in the art upon reading this disclosure, accompanying and forming a part of which is a drawing comprising Figure 1, a schematic flow chart showing the carbon black collecting and conveying system embodying my invention and Figure 2, a schematic drawing of a modification of the invention as shown in Figure 1.

Broadly, the invention relates to apparatus for separating finely divided solid material from a fluid comprising first separation means adapted to remove a portion of said fluid from said solid material, second separation means adapted to remove a second portion of said fluid from said solid material, material conveying means communicating with the outlet of said first separation means and the inlet of said second separation means, said material conveying means being of such size that fluid material not removed from said solid material in said first separation zone will serve to convey said solid material through said material conveying means to said second separation means. By this apparatus it is possible to practice the process of my invention, the process being one for separating finely divided solids from a fluid wherein a mixture of finely divided solids and fluids are introduced into a separation zone, a fluid stream and a solids stream are separately removed from said separation zone, and said solids stream is conveyed to a second separation zone by a conveying fluid, the improvement comprising removing a portion of said fluid with said solids, said removed portion of said fluid serving as said conveying fluid. More specifically, I provide apparatus for collecting carbon black from a gas stream comprising a precipitator; an inlet conduit communicating with said precipitator; an outlet conduit extending from the lower end portion of said precipitator; a series of cyclone separators; a conduit extending from the upper end portion of each of said cyclone separators to the succeeding one; a conduit extending from the upper end portion of said precipitator to the first of said cyclone separators; an outlet conduit extending from the lower end portion of each of said cyclone separators; a bag filter; a conduit extending from the upper end portion of the last of said series of cyclone separators to said bag filter; an off gas removal conduit extending from said bag filter; a first blower; a conduit extending from the lower end portion of said bag filter to said first blower; a conduit extending from said blower to said conduit extending from the upper end portion of said precipitator to the first of said cyclone separators; a second blower; a collection conduit connecting the outlet conduit extending from the lower end portion of said precipitator, the outlet conduits extending from the lower end portion of each of said cyclones and said second blower; a black collector; a conduit extending from said second blower to said black collector; and means in all of said outlet conduits extending from the lower end portion of said precipitator and the lower end portion of each of said cyclone separators except the one of said outlets furthest removed in line of flow from said second blower, said means permitting flow of carbon black while preventing substantial gas flow.

This apparatus and process can be understood more fully following a consideration of the drawing and attention is directed thereto. In Figure 1 there is shown a carbon black producing and collecting system, the source being a furnace 10, this being any carbon black furnace known to the prior art such as Ayres Reissue Patent Re. 22,886 (1947), Krejci 2,375,795 (1945) or Krejci 2,564,700 (1951).

Supplied to furnace 10 is a feed 12 of a carbonaceous material, preferably a hydrocarbon liquid or gas and air is supplied by conduit 13. In the furnace 10 the carbonaceous material is converted by a pyrolytic reaction and/or incomplete combustion into a gaseous effluent leaving the furnace by discharge conduit 14. The furnace effluent is quenched by introduction of water in zone 16, the water being supplied by conduit 17 although other quench systems are applicable and the quench zone 16 is not essential to my process. The quench gases are passed by conduit 18 to a first separation zone 19, this being, generally, an electrical precipitator in which the gases pass between pairs of oppositely charged plates or wires having an electrical potential applied thereto. A portion of the black is precipitated in precipitator 19 and separates as flocculent carbon black in the bottom of precipitator 19 while a portion of the black passes by conduit 21 to one or more cyclone separators in series, two separators 22 and 23 being shown, the gases passing from the upper end portion of cyclone separator 22 to cyclone separator 23 by means of conduit 24. Due to the gas flow reversal in a cyclone separator, further portions of black are separated from the gas in each of these zones, this separated black accumulating in the lower end portion of each of the separators. In some installations one separator may be sufficient and, although I have shown two in Figure 1, a series of primary, secondary and tertiary separators have been found to be most satisfactory. The gas issuing from the last cyclone separator is passed by conduit 26 to a filter 27, such as a bag filter. In a bag filter the gases pass through tightly woven bags and practically all of the black is removed from the effluent gas. In the drawing the details of the bag filter are not shown since the specific type does not constitute a feature of my invention. Off-gas, containing substantially no carbon black, is discharged to the atmosphere to conduit 28.

The black collected in the bottom of separation means 19 and cyclone separators 22 and 23 is passed from outlet conduits 29, 31 and 32 through a common pneumatic conveying conduit 33 to blower 34. From blower 34 the carbon black is passed to black collector 36 pneumatically through conduit 37. Prior operation has been to supply gas to conduit 33 to move the black pneumatically through this conduit, this gas being supplied by a blower using an external gas source or by using a portion of the gas from conduit 18, the gas immediately downstream of the quench chamber. Also, in prior operation, it has been the practice to use intermittent feeders in the separation apparatus outlets such as star valves. These star valves were used in each of the separation chambers.

I have discovered that the apparatus can be operated to obtain the same results while eliminating one of the star valves. This is a considerable advantage which represents a saving of thousands of dollars in each installation in equipment cost as well as an operating cost of several dollars per day. When operating according to my invention the star valve is omitted in the separation chamber farthest removed in point of carbon black flow from the blower 34. This is shown in Figure 1 wherein star valves 38 and 39 are shown in conduits 31 and 32 extending from cyclone separators 22 and 23. In view of the large temperature variation involved in these separators, these star valves are not air tight but are designed to permit as small as possible gas flow therethrough. No star valve is present in the outlet from the lower portion of electrical precipitator 19.

In operating according to the process of this invention a portion of the gaseous material supplied to electrical precipitator 19 is permitted to flow through the carbon black outlet conduit in the bottom end portion of the precipitator. This gas provides the gas for pneumatically conveying the black through conduit 33.

To complete the description of Figure 1, it is pointed out that the product from bag filter 27 is passed by conduit 39 to blower 41 and from blower 41 by means of conduit 42 to conduit 21. This provides for ultimate recovery of the black obtained in the bag filter. As an alternative, conduit 42 can be connected to conduit 18 but it is not generally necessary to pass this stream through electrical precipitator 19. The black product obtained in black collector 36 is removed by conduit 43 for use and shipment with or without pelleting and/or bagging. The gaseous effluent is removed from the upper end portion of collector 36 and generally recycled by conduit 44 to conduit 18 for recovery of black not separated from the gas in collector 36.

A modification of the apparatus is shown in Figure 2 but this is actually based upon the same fundamental invention. In this drawing, reference numerals common to Figure 1 being used as far as practical, there are shown electrical precipitator 19, conduit 21, cyclone separator 22, cyclone separator 23, black effluent conduits 29, 31, 32, conduit 33, blower 34, conduit 26, conduit 24, conduit 37 and conduit 42. The change in this figure is a reversal of flow in conduit 33 wherein the gas for pneumatically conveying the black through this conduit is supplied from cyclone separator 23. To establish this flow, no star valve is provided in the outlet from cyclone separator 23 but such valves are used in the other separation chambers, star valves 46 and 47 being shown. In operation, a portion of the gas supplied to cyclone separator 23 is removed with the carbon black product and this gas serves to convey the black separated in this separator as well as that obtained in the other separators.

The selection of the source of the conveying gas can thus be varied. The only requirement is that it be obtained from the separation means farthest removed from the blower. Thus if three cyclone separators were used the third in line of gas flow would be the one supplying the gas for pneumatically conveying the black.

It is desired that there be as little restriction as possible in the outlet from the separation chamber from which this gas is supplied. This can be controlled by using a variety of removable throats of various sizes in the outlet from this chamber.

The drawing is a schematic one intending to illustrate the invention in a simple form. Those skilled in the art will recognize that many apparatus components have been omitted but these are not essential to an understanding of the invention. For instance, most of the lines would be provided with valves for controlling flow therethrough. Furthermore, most of the chambers and lines would be provided with wrappers to prevent accumulations of black therein.

The following example sets forth particular operating details for one specific embodiment of my invention although, obviously, many variations are possible. In this operation black is produced in furnace 10 and quenched in chamber 16 to provide an effluent from chamber 16 in line 18 containing about 67 pounds of black per minute and 100,000 cubic feet per minute of gas at a temperature of 450° F. at a pressure of about 10 inches of water. The recycle stream in conduit 44 contains approximately 12.5 pounds of black per minute and is at a pressure of about 8 inches of water. Precipitator 19 has an internal pressure of about 6 inches of water so that the pressure in conduit 33 is just slightly under 6 inches. Conduit 33 is an 8 inch line. Blower 34 operates to provide a vacuum of about 2 inches of water. There is some pressure drop in cyclones 22 and 23 so that the pressure in conduit 26 is about 3 inches of water. It is important that the pressure in conduit 33 drop more rapidly than that through cyclone separators 22 and 23 so that there is no back pressure in conduits 31 and 32 which would tend to stop flow of black therethrough. If the pressure in line 33 is sufficient to produce this back pressure it is necessary to reduce the size of the outlet from precipitator 19 so that less gas is removed with the black. The pressure in line 37 is about 15 inches of water and the pressure in line 44 immediately above collector 36 is about 12 inches of water. Black recovery from the system is approximately 4,000 pounds per hour.

It will be noted that accurate control of the pressures is necessary for operation with this system. Less critical is the system of Figure 2. The pressures are substantially the same in the separators 19, 22 and 23 but the gas supplied to convey the black is obtained from the last cyclone separator and is, therefore, at the lowest pressure in the system. Because of further line drops, it will be seen that it is impossible for this to result in back pressure in conduits 29 and 31 and the danger of incomplete removal of black from separators 19 and 22 is avoided.

While I have set forth my invention as it applied to a particular solids recovery system, it will be apparent that the fundamental concept of the invention is not limited to black recovery. Additional applications include dust collection where purified air is required and catalyst separation and recovery systems. Broadly, the invention is related to any pneumatic or hydraulic conveying system because it provides a source of conveying fluid which is not dependent upon an outside source. When the pressure in the feed to the system changes, the amount of gas supplied to the conveying zone changes proportionately. This provides an automatic regulation which is not present in prior systems.

As many possible embodiments can be made of this invention without departing from the scope thereof, it is to be understood that all matter herein set forth is to be interpreted as illustrative and not as unduly limiting the invention.

I claim:

1. In apparatus for collecting finely divided solid material from a gas stream comprising an electrical precipitator separator, at least one cyclone separator, a bag filter, a collector, and a pneumatic conveyor conduit adapted to convey said solids from at least said precipitator separator and each said cyclone separator to said collector, and flow control means in the lower end portion of all but one of said precipitator separator and each said cyclone separator for passing said solids to said pneumatic conveyor without permitting substantial gas flow thereto, the separator without said flow control means having constantly open discharge means and being located farthest in line of solid material flow in said pneumatic conveyor conduit from said collector.

2. In apparatus for collecting carbon black from a gas stream comprising an electrical precipitator separator, at least one cyclone separator, a bag filter, a carbon black collector, and a pneumatic conveyor conduit adapted to convey black from at least said precipitator separator and each said cyclone separator to said collector, and flow control means in the lower end portion of all but one of said precipitator separator and each said cyclone separator for passing carbon black to said pneumatic conveyor without permitting substantial gas flow thereto, the separator without said flow control means having constantly open discharge means and being located farthest in line of black flow in said pneumatic conveyor conduit from said collector.

3. Apparatus for collecting carbon black from a gas stream comprising a precipitator; an inlet conduit communicating with said precipitator; an outlet conduit extending from the lower end portion of said precipitator; a series of cyclone separators; a conduit extending from the upper end portion of each of said cyclone separators to the succeeding one; a conduit extending from the upper end portion of said precipitator to the first of said cyclone separators; an outlet conduit extending from the lower end portion of each of said cyclone separators; a bag filter; a conduit extending from the upper end portion of the last of said series of cyclone separators to said bag filter; an off gas removal conduit extending from said bag filter; a first blower; a conduit extending from the lower end portion of said bag filter to said first blower; a conduit extending from said blower to said conduit extending from the upper end portion of said precipitator to the first of said cyclone separators; a second blower; a collection conduit connecting the outlet conduit extending from the lower end portion of said precipitator, the outlet conduits extending from the lower end portion of each of said cyclones and said second blower; a black collector; a conduit extending from said second blower to said black collector; and flow control means in all of said outlet conduits extending from the lower end portion of said precipitator and the lower end portion of each of said cyclone separators except the one of said outlets furthest removed in line of flow from said second blower, said means permitting flow of carbon black while preventing substantial gas flow, the outlet conduit without said flow control means being constantly open.

4. The apparatus of claim 3 wherein said means for permitting flow of carbon black while preventing substantial gas flow are present in the outlet conduits of each of said cyclone separators but absent from said precipitator.

5. The apparatus of claim 3 wherein said means for permitting flow of carbon black while preventing substantial gas flow are present in the outlet conduits of said precipitator and each of said cyclone separators except for the cyclone precipitator immediately preceding said bag filter.

6. A process of collecting carbon black from a gas stream containing the same, comprising passing said stream into a precipitation zone wherein a portion of said black is precipitated and removed through the black removal outlet in the bottom portion of said zone, passing effluent gas from the upper end portion of said precipitation zone serially through at least one cyclone separation zone and a filter zone, removing black through the black removal outlet in the lower portion of each of said last mentioned zones, passing black from said precipitation zone and said cyclone separation zone to a black collection zone through a common pneumatic conveying zone, supplying gas for said pneumatic conveying zone from the one of said precipitation and cyclone separation zones located farthest in line of carbon black flow in said pneumatic conveying zone from said black collection zone through the black removal outlet, gas flow from other of said precipitation and cyclone separation zones through the black removal outlet being substantially completely blocked.

7. A process of collecting carbon black from a gas stream containing the same, comprising passing said stream into precipitation zone wherein a portion of said black is precipitated and removed through the black removal outlet in the bottom portion of said zone, passing effluent gas from the upper end portion of said precipitation zone through a series of cyclone separation zones and a filter zone, removing black through the black removal outlet in the lower portion of each of said cyclone separation zones and said filter zone, passing black from said precipitation zone and each of said cyclone separation zones to a black collection zone through a common pneumatic conveying zone, said pneumatic conveying zone collecting black successively from said precipitation zone and said series of cyclone separation zones, supplying gas for said pneumatic conveying zone from said precipitation zone through the black removal outlet, gas flow from said cyclone separation zones through the black removal outlet being substantially completely blocked.

8. A process of collecting carbon black from a gas stream containing the same, comprising passing said stream into a precipitation zone wherein a portion of said black is precipitated and removed through the black removal outlet in the bottom portion of said zone, passing effluent gas from the upper end portion of said precipitation zone through a series of cyclone separation zones and a filter zone, removing black through the black removal outlet in the lower portion of each of said cyclone separation zones and said filter zone, passing black from said precipitation zone and each of said cyclone separation zones to a black collection zone through a common pneumatic conveying zone, said pneumatic conveying zone collecting black successively from said series of cyclone separation zones and said precipitation zone, supplying gas for said pneumatic conveying zone from the cyclone separation zone farthest removed in line of flow in said pneumatic conveying zone from said precipitation zone, gas flow from the black outlets of said precipitation zone and cyclone separation zones other than said cyclone separation zone farthest removed from said precipitation zone being substantially completely blocked.

References Cited in the file of this patent

UNITED STATES PATENTS

| | | |
|---|---|---|
| 840,301 | Cook | Jan. 1, 1907 |
| 1,928,702 | O'Mara | Oct. 3, 1933 |
| 2,391,863 | Bowen | Jan. 1, 1946 |
| 2,717,658 | Bethea et al. | Sept. 13, 1955 |
| 2,771,158 | Bray et al. | Nov. 20, 1956 |
| 2,851,124 | Howell | Sept. 9, 1958 |